Feb. 5, 1935.  J. B. WHITE  1,990,444
ROTARY VALVE
Filed Oct. 24, 1934  2 Sheets-Sheet 1
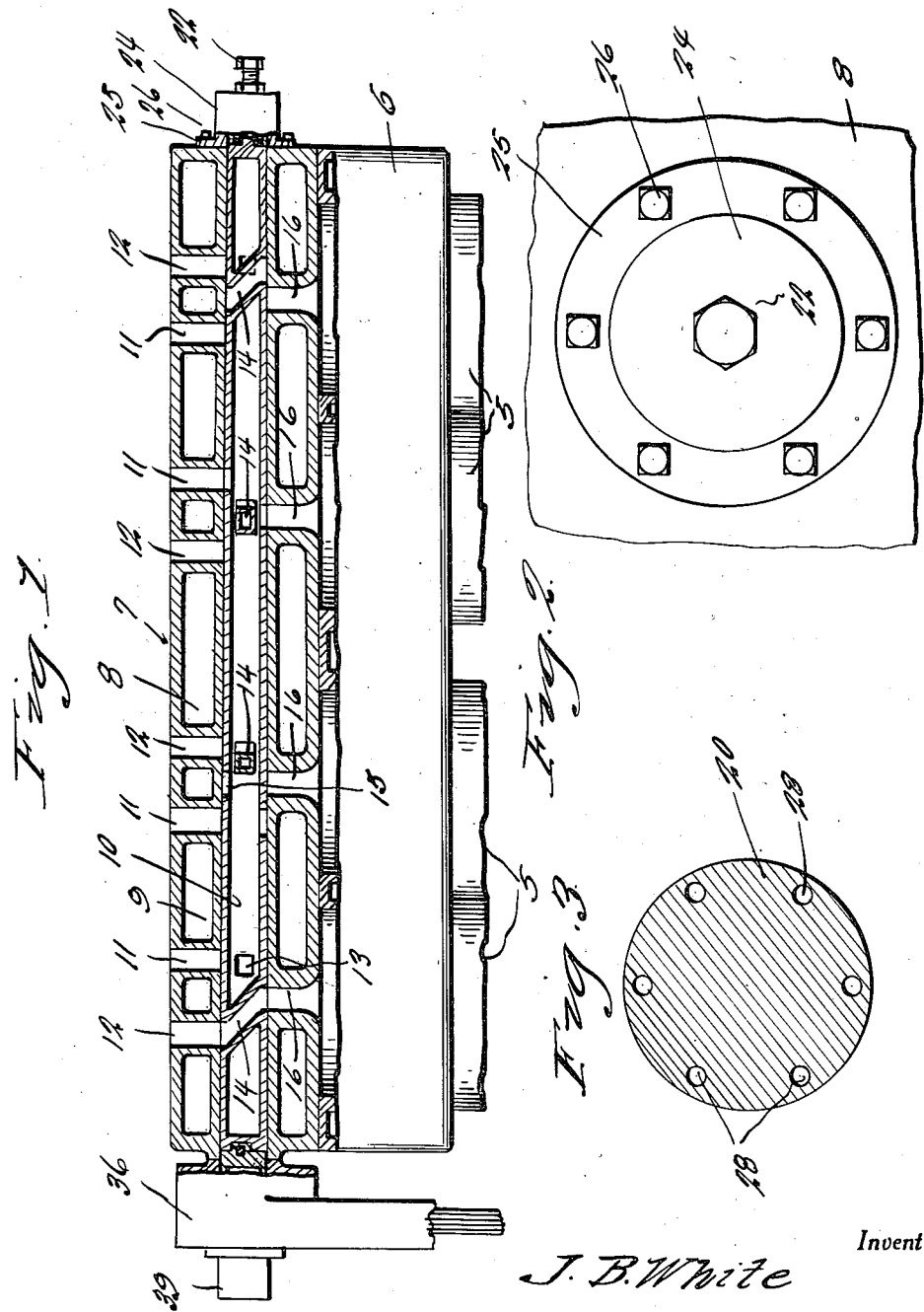
Inventor
J. B. White
By Clarence A. O'Brien
Attorney

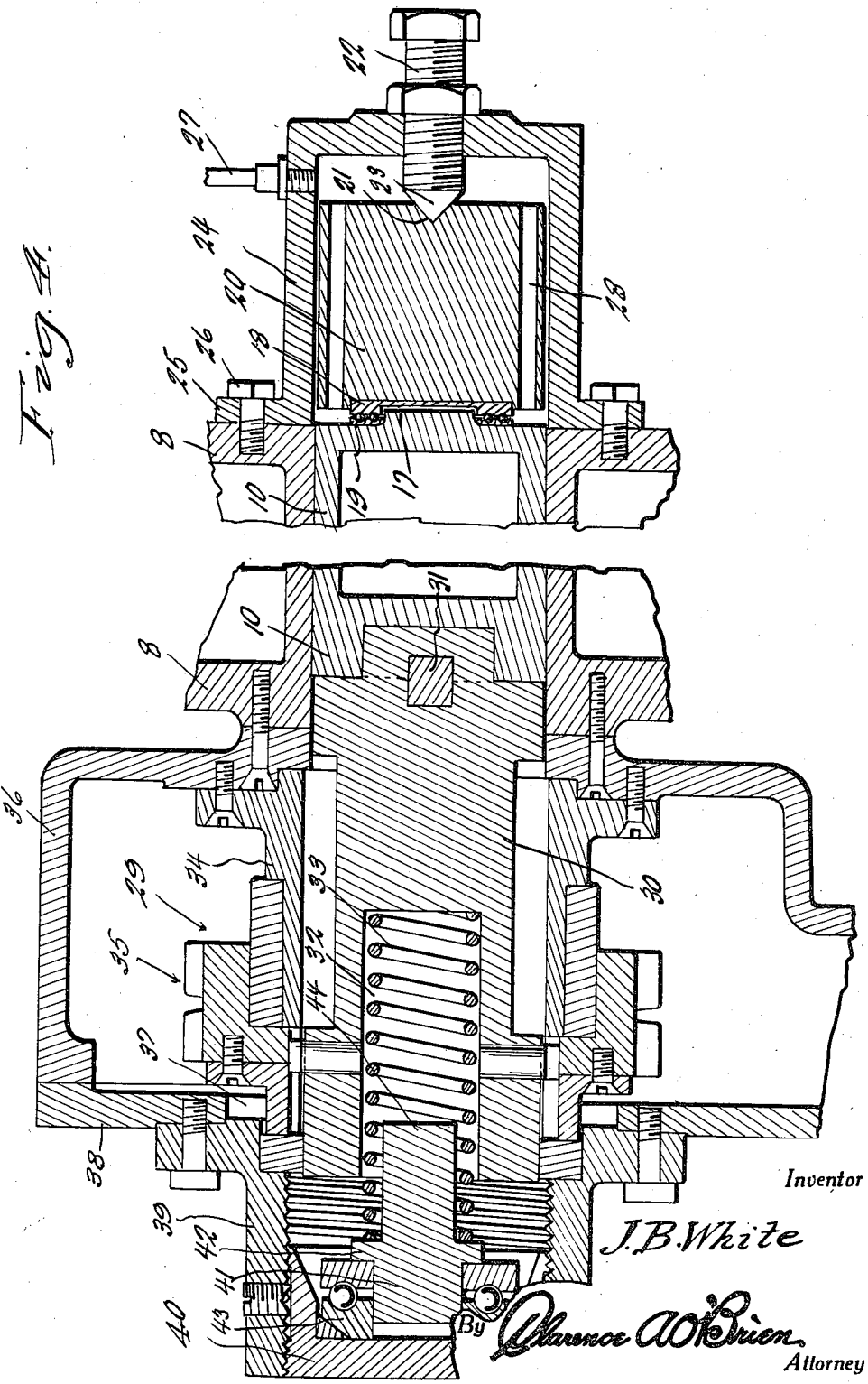

Patented Feb. 5, 1935

1,990,444

UNITED STATES PATENT OFFICE 1,990,444

ROTARY VALVE

John B. White, Portland, Oreg., assignor to White Rotary Valve Corporation, a corporation of Oregon Application October 24, 1934, Serial No. 749,860

7 Claims. (Cl. 123—59)

The present invention appertains to new and useful improvements in the art of internal combustion engines and more particularly to a novel rotary valve structure.

The principal object of this invention is to provide a rotary valve wherein means is provided for preventing binding action of the valve proper with respect to the bore in which it operates, when expansion takes place under the heat of the operating engine.

Another important object of the invention is to provide a tapered rotary valve structure wherein means is provided at one end for tensioning the valve proper to a snug fit within the valve bore and with means at its opposite end for shifting the valve proper against the action of the tensioning means in proportion to the expansion of the valve proper.

Other important objects and advantages of the invention will become apparent in the following specification.

In the drawings:

Figure 1 represents a fragmentary detailed sectional view through the valve proper and the adjacent structure of the engine head.

Figure 2 represents a fragmentary end elevational view of the engine, showing the expansion unit.

Figure 3 represents a cross sectional view of the expansion body.

Figure 4 represents a fragmentary vertical sectional view through the expansion unit at one end of the engine and the tensioning means at the opposite end of the engine, both being aligned and associated with the valve proper.

Referring to the drawings wherein like numerals designate like parts, it can be seen that numeral 5 represents the cylinders of the internal combustion engine, while numeral 6 represents the cylinder head. The valve structure is generally referred to by numeral 7, the same including the water jacket 8, with the core 9 having a tapered bore extending longitudinally therethrough to accommodate the tapered valve 10.

Individual intake and exhaust ports 11 and 12 respectively extend downwardly through the top of the valve jacket 8, and through the uppermost portion of the core 9 and are registrable with the openings 13 and by-passes 14 in the valve proper 10. The openings 15 in the valve proper and the by-passes 14 are registrable with the common conduit 16 communicating with the cylinders 5.

Each end of the valve 10 is closed, the reduced ends thereof being provided with a boss 17 for engagement into the recess of the bearing plate 18. A ball bearing mount 19 is interposed between the bearing plate 18 and the adjacent end of the valve 10. The expansion body 20, which is preferably cylindrical, is recessed at its inner end to accommodate the bearing plate 18, while its opposite end is provided with a conical recess 21 into which the set screw 22 is engaged at its inner conical end 23. This set screw 22 is feedable through a threaded opening in the closed end of the cylinder 24, which is flanged at its open end, as at 25, and has screws 26 passing through the flanged end 25 for securing the said cylinder 24 at this end to the adjacent end of the valve structure jacket 8.

Numeral 27 represents a lubricant feed line communicating with the interior of the cylinder 24. At this point, it is to be understood that the expansion body 20 has the same coefficient of expansion longitudinally as the rotary valve has radially, and to attain this coefficient accurately, the body 20 can be bored, as at 28, longitudinally so that the proper coefficient can be arrived at. In experiment, it has been found that the body 20 can be prepared to absorb thermal units by longitudinal conductivity through the bores discretionally placed through the body, so that the longitudinal extension under a given temperature will be in proportion to the radial extension of the tapered valve, to the end that the valve will assume the proper fit in the seat at all engine temperatures. Thus with the valve stem normally fitting snugly within the core 9, the body 20 is in its normal retracted condition. However, when the valve 10 is subjected to the heat of the engine, the same will obviously expand radially, and to prevent sticking or binding of the valve within the bore, the body 20 acts by expanding longitudinally with the same co-efficiency as the radial expansion of the valve 10, to shift the valve 10 longitudinally in a direction toward the opposite end of the jacket 8 so as to always maintain a running fit between the cylinder and the bore, within which it operates.

In a co-pending application filed concurrently with this application, Serial No. 749,859 the driving mechanism generally referred to by numeral 29 is specifically set forth, and consequently only that portion of the driving mechanism relative to the present invention will be described. As clearly shown in Figure 4, a driving core 30 is detachably keyed, as at 31, to the large end of the valve 10, and is aligned therewith in the manner shown, which is explained in the aforementioned application.

The outer end of this core 30 is provided with a pocket 32 for receiving one end portion of the coiled and compressible spring 33. As is described in my co-pending application, numeral 34 represents a trunnion on which the gear assembly 35 rides and as shown, a splined connection is provided between this gear assembly at the driving core 30. A housing 36 surrounds the driving mechanism, and circumventing the opening 37 of the cover plate 38 and secured to the said cover plate is the collar 39, internally threaded to receive the threaded plug 40.

Numeral 41 represents the head of a guide for the spring 33, and numeral 42 represents a circumferential flange on the guide. Numeral 43 represents a bearing assembly interposed between the plug 40 and the flange 42, while numeral 44 represents a shank on the head 41 which projects through a substantial number of the convolutions of the spring 33.

Obviously, by adjusting the plug 40, the proper tension can be exerted by the spring 33 against the core 30 and consequently against the valve 10. By properly setting the set screw 22, so as to maintain the body 20 against the reduced end of the valve 10 to afford a thrust bearing for the valve at one end, and maintaining the proper tension against the opposite end of the valve, the valve can be maintained at the same fit within the core 9 regardless of the heat increase and decrease, which is taken care of by the expansion block 20 in the manner hereinbefore described.

While the foregoing specification sets forth the invention in definite terms, obviously numerous changes may be resorted to without departing from the spirit and scope of the following claims.

Having thus described my invention, what I claim as new is:—

1. In combination, a rotary valve, a spring for exerting tension against the valve at one end, and an expansion unit at the opposite end of the valve having the same coefficient of expansion longitudinally as the valve has radially.

2. In combination, a rotary valve, tension means at one end of the valve, a thrust bearing at the opposite end of the valve, and means against the thrust bearing having the same coefficient of expansion in a direction longitudinally of the valve as the valve has radially.

3. In combination, a tapering valve, a body having a tapering bore therethrough to receive the valve, a spring at one end of the valve for urging the valve into a snug fit within the bore, and an expansion unit at the opposite end of the valve for urging the valve in a direction toward the spring when subjected to an increased temperature.

4. In combination, a tapering valve, a body having a tapering bore therethrough to receive the valve, a spring at one end of the valve for urging the valve into a snug fit within the bore, an expansion unit at the opposite end of the valve for urging the valve in a direction toward the spring when subjected to an increased temperature, the said expansion unit having the same coefficient of expansion longitudinally against the valve as the valve has radially.

5. In combination, a rotary valve, an expansion unit at one end of the valve, said unit including a body serving as a thrust bearing for the valve, and means for adjusting the body with respect to the valve.

6. An expansion unit for tapered rotary valves comprising a block for bearing disposition against one end of the valve, and means at one end of the body for preventing expansion in that direction.

7. An expansion unit for rotary tapered valves comprising a body of expansible material for bearing disposition against one end of the valve, and means abutting one end of the body requiring the body to expand in the opposite direction.

JOHN B. WHITE.